United States Patent [19]

Hozumi et al.

[11] 4,182,854

[45] Jan. 8, 1980

[54] PROCESS FOR REMOVING VOLATILE MATTER FROM STYRENE RESIN

[75] Inventors: Yukio Hozumi, Hirakata; Tuguo Kuwayama; Yosinori Kuroda, both of Sakai, all of Japan

[73] Assignee: Daicel Ltd., Sakai, Japan

[21] Appl. No.: 917,293

[22] Filed: Jun. 20, 1978

Related U.S. Application Data

[63] Continuation of Ser. No. 769,875, Feb. 18, 1977, abandoned.

[30] Foreign Application Priority Data

Mar. 5, 1976 [JP] Japan .................................. 51-23976

[51] Int. Cl.$^2$ .............................................. C08F 6/24
[52] U.S. Cl. ................................................ 528/500
[58] Field of Search ..................... 528/500; 260/880 R

[56]  References Cited

U.S. PATENT DOCUMENTS

| | | | |
|---|---|---|---|
| 2,713,043 | 7/1955 | Daumiller | 528/500 |
| 3,325,457 | 6/1967 | Finestone et al. | 528/500 |
| 3,491,071 | 1/1970 | Lanzo | 528/500 |

*Primary Examiner*—Stanford M. Levin
*Attorney, Agent, or Firm*—Blanchard, Flynn, Thiel, Boutell & Tanis

[57]  ABSTRACT

Volatile substances are removed from styrene resin by introducing steam into styrene resin suspended in hot water, while agitating the suspension, to maintain the suspension at a temperature of 120° to 150° C. and a pressure of 1.4 to 4 kg/cm$^2$G whereby to remove the volatile substances.

5 Claims, 1 Drawing Figure

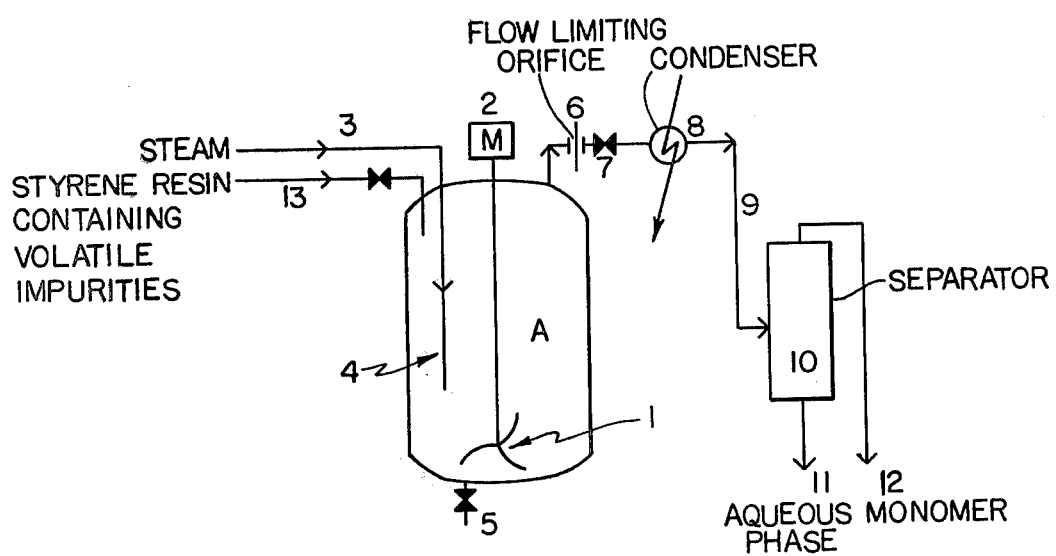

PROCESS FOR REMOVING VOLATILE MATTER FROM STYRENE RESIN

This is a continuation of application Ser. No. 769,875, filed Feb. 18, 1977, now abandoned.

BACKGROUND OF THE INVENTION

FIELD OF THE INVENTION

The present invention relates to a process for removing volatile substances from styrene resins containing such substances. More particularly, the invention relates to a process for efficiently removing volatile substances from styrene resins prepared by suspension polymerization which resins contain a considerable amount of volatile substances comprised of unreacted monomers.

The known styrene resins include polystyrene (PS), styrene-rubber polymer (HIPS), styrene-acrylonitrile copolymer (AS) and styrene-acrylonitrile-butadiene copolymer (ABS). Various other styrene copolymers have also been developed.

However, the as-polymerized styrene resins contain unreacted monomers because it is disadvantageous, for reasons of cost and resin quality, to carry out the polymerization to such an extent that the entirety of the monomer or monomers used for the polymerization are converted to the polymer.

Accordingly, it is necessary to remove the unreacted monomer or monomers from the styrene resin containing unreacted monomers after termination of the polymerization. Various processes have been develped for removing the unreacted monomers.

There are many processes for removing unreacted monomers from styrene resins containing unreacted monomers, including (1) a process in which the resin containing volatile substances is heated and subjected to extrusion molding to obtain moldings in the form of thin strands and such moldings are treated under reduced pressure, (2) a process wherein a vented extruder is used to remove the volatiles, (3) a steam distillation process and (4) a process in which extrusion is effected with a solvent. However, these known processes have the following disadvantages: In process (1), even though a large surface area for escape of the volatiles is provided, the degasification efficiency is nevertheless low because the volatilization of the volatile matter occurs only from the surfaces of the strands and fresh surfaces are not continuously exposed. Process (2) requires a multistage system and, due to the high shearing force and stirring energy applied to the resin, there occurs a reduction of the molecular weight of the polymer and in the case of polymers containing dispersed rubbery elastic particles such particles are broken whereby the properties of the resin are deteriorated. In process (3), operation is relatively simple but a long time is required and the energy consumption is large which is economically disadvantageous. Process (4) is complicated because a solvent is used therein. Thus, under the existing circumstances, processes (1)–(4) cannot be considered to be fully satisfactory and the removal of volatile matters from styrene resins is accompanied with the above defects in addition to economic loss.

SUMMARY OF THE INVENTION

The present invention is intended to eliminate those disadvantages. More particularly, the invention provides an improvement in or relating to steam distillation process, process (3) above. According to the process of the present invention, volatile matter is removed from styrene resins containing volatile matter in an economical and efficient manner. The process of the present invention will be described below is detail.

In the preparation of styrene resins by suspension polymerization, there has been known a process wherein steam is introduced into the slurry after termination of the polymerization in order to remove unreacted monomers from the styrene resin by steam distillation. However, it has been considered to be very difficult to remove the monomers from the resin by that known process and the process is not employed practically at present (Saeki, "Polymer Production Process" p. 135, published by Kogyo Chosakai).

This is attributable to the following reasons: In the conventional steam distillation process which is carried out under atmospheric or reduced pressure, the diffusion velocity, in the resin, of an aromatic vinyl compound of a relatively high boiling point such as styrene, a-methylstyrene, o-methylstyrene or p-methylstyrene is not as high as expected and, therefore, a long time is required for lowering the monomer concentration in the resin to the desired point. Further, for increasing the velocity of removal of the monomers from the resin, it is inevitable to discharge a large quantity of water from the steam distillation tank together with the monomers, thereby causing a great energy consumption. Thus, in the removal of unreacted monomers from the styrene resins containing unreacted monomers, the cost and time requirements are excessive so that this process is not commercially used at present.

The inventors have succeeded in achieving effective removal of unreacted monomers from styrene resin containing unreacted monomers by steam distillation, but in a more economical and efficient manner which overcomes the disadvantages of the prior steam distillation process.

More particularly, the inventors have found that the volatile matters can be removed from the resin particles in a slurry obtained by suspension polymerization by introducing steam therein under pressure. The present invention has been accomplished on the basis of this discovery. This discovery is beyond expectations from a common-sense standpoint. The present invention is particularly suitable for effecting removal of aromatic vinyl compound monomers of relatively high boiling points such as styrene.

Compared with the conventional steam distillation process which is carried out at around atmospheric pressure, the process of the present invention for removing volatile matter by steam distillation under pressure reduces the treatment time remarkably to $\frac{1}{2}$ to $\frac{1}{4}$ the time previously required.

As for the steam distillation conditions according to the invention, it is critical to maintain the slurry under a pressure of 1.4 to 4 $Kg/cm^2G$ and at a temperature of 120° to 150° C. If a pressure of below 1.4 $Kg/cm^2G$ or a temperature of below 120° C. is employed, the remarkable effect superior to that of the known steam distillation process cannot be obtained and, on the other hand, if a pressure of above 4 $Kg/cm^2G$ or a temperature of above 150° C. is employed, melting of the styrene resin cannot be prevented generally and the effect of removal of the volatile matter is reduced.

According to the present invention, though steam can be introduced directly into the slurry after completion of suspension polymerization, it is preferred to add a dispersant which is effective at a high temperature, such as magnesium hydroxide, when the particles are capable of fusing together at a high temperature of 120° to 140° C.

It is necessary in the present invention to agitate the styrene resin particles effectively in hot water. As the agitation means, there can be used conventional stirring devices such as paddle-type agitators, propeller-type agitators and turbine-type agitators. For increasing the agitating effect, it is necessary to employ a high rotation velocity. However, the use of an excessive rotation velocity should be avoided because it will cause excessive foaming and, even if a defoaming agent is used, it becomes impossible to obtain an adequate defoaming effect. Thus, it is preferred to employ stirring by steam jets in addition to the mechanical agitation.

The velocity of the steam introduced into the slurry is preferably above 50 m/sec., particularly preferably above 100 m/sec. The temperature of the steam can be almost equal to that of the liquid to be treated but preferably the steam temperature is 10° to 20° C. higher than the liquid temperature. Of course the temperature of the steam may be a little higher or lower than the liquid temperature, provided that the liquid temperature is always kept within a desired range.

The steam pressure can be equal to the pressure inside the steam distillation tank but preferably it is so a little higher than the inside pressure as to make the introduction of steam easier.

The styrene resins that can be treated according to the invention include, for example, homopolymers of styrene monomer, copolymers made of styrene monomer and other monomers copolymerizable therewith, mixtures of them with rubbery elastic substances and block polymers thereof.

The styrene monomers include styrene, a-methylstyrene and vinyltoluene. The monomers copolymerizable with the styrene monomers include methyl acrylate, methyl methacrylate and acrylonitrile. The rubbery substance is any of the known rubbery substances used in combination with styrene such as natural rubber, polybutadiene, polyisoprene and butadiene/styrene copolymer. Further, ABS resins having a high acrylonitrile content which have been developed recently are also included.

The process of the invention for removing volatile matter is especially suitable for the preparation of styrene resins prepared by suspension polymerization because of the great advantage that the slurry from the suspension polymerization step can be subjected directly to steam distillation after incorporation therein of an effective amount of a dispersant and/or a defoaming agent.

Thus, the process of the invention is very effective, because it requires no special extracting reagent (such as methanol), it comprises simple steps and, advantageously, only a short treatment time is needed.

This invention can be effected either by continuous process or batch process. In the continuous process, it is also possible to lead a stream of styrene polymer from one distillation tank to another.

The following examples further illustrate the invention. In the Examples, all references to "parts" means parts by weight.

BRIEF DESCRIPTION OF THE DRAWING

The drawing is a schematic illustration of the process of the invention.

EXAMPLES 1-3 Comparative Example 1

100 Parts of a mixture of styrene monomer and acrylonitrile monomer in a weight proportion of 70:30 and in which a peroxide catalyst, a molecular weight-regulating agent, etc. had been dissolved in a conventional manner and 100 parts of water containing a Ca-salt as a dispersion stabilizer were placed in a suspension polymerization vessel and suspension polymerization was effected. After termination of the polymerization, there was obtained an acrylonitrile/styrene copolymer in the form of an aqueous slurry having a particle diameter in the range of 100 to 1000$\mu$ and a residual monomer content in the range of 1 to 5 wt.%.

Before subjecting the product to steam distillation, 7 parts of a dispersion of 5% magnesium hydroxide in water and 0.05 part of Nissan Disfoam were added to 100 parts of the slurry to effect adjustment of the slurry composition.

Then, the liquid to be treated was subjected to steam distillation by the process shown in FIG. 1. The liquid was charged through a pipe 13 into a pressure-resistant steam distillation tank A provided with a propeller-type stirrer 1. The stirrer 1 was rotated by a motor 2. Steam at a pressure of 4Kg/cm$^2$G was introduced into the liquid at a velocity of 200 m/sec. through a nozzle 4 provided at the end of a steam introducing pipe 3. The nozzle 4 was placed near the bottom of the steam distillation tank A and was submerged in the liquid. At this time the valve 7 was closed. The liquid to be treated was heated to about 130° C. and the internal pressure of the steam distillation tank rose to 2 Kg/cm$^2$. Thereafter, the valve 7 was opened to discharge the steam in the vapor phase from the steam distillation tank through the pipe 9. The time at which the valve 7 was opened is considered to be the start of the steam distillation. Samples of the liquid were removed, from time to time, through a valve 5 at the bottom of the steam distillation tank A. The resin having a particle diameter in the range of 350 to 400$\mu$ was subjected to gas chromatography to determine the remaining monomeric styrene present therein. The styrene monomer concentration in the resin at the start of the distillation is represented by $W_o$.

The procedure of removing the steam from the gas phase in the steam distillation tank A and condensing the same in a condenser 8 was continued while the operation pressure in the steam distillation tank was kept at 2 Kg/cm$^2$G by introducing more steam at 4 Kg/cm$^2$ through the steam introduction pipe 3. The quantity of the distillate condensed in the condenser 8 was controlled with a flow-limiting orifice 6. The quantity of distillate was 3 wt.%/hr. based on the charged amount of the liquid to be treated.

In FIG. 1, 9 indicates a conduit, 10 indicates a separator, 11 indicates an outlet for the aqueous phase and 12 indicates an outlet for the monomer.

For determining the amount of the monomer removed during the steam distillation, the liquid to be treated was sampled at time intervals of $O_1$, $O_2$, $O_3$ . . . to obtain values $W_1$, $W_2$, $W_3$ . . . in the same manner as in the determination of $W_o$. The proportions of $W_1/W_o$, $W_2/W_o$, $W_3/W_o$ . . . were calculated. The relationship between the proportion $W_1/W_o$ etc. and O was plotted on a semilogarithmic coordinate graph. From the gradient of the curve thereby obtained, a monomer-removing velocity coefficient K=0.40 was obtained. The same procedure was repeated except that the pressure in the tank, temperature and steam introduction velocity in the steam distillation were altered. The results are shown in the following table.

| No. | Pressure kg/cm$^2$G | Temp. °C. | Steam introduction rate m/sec. | Monomer removing velocity coefficient K. |
|---|---|---|---|---|
| Example 1 | 2 | 130 | 200 | −0.40 |
| Example 2 | 3 | 140 | 200 | −0.48 |
| Example 3 | 2 | 130 | 50 | −0.30 |
| Comparative Example 1 | 0 | 100 | 50 | −0.15 |

EXAMPLE 4

10 Parts of a butadiene synthetic rubber (SBR) dissolved in styrene were added to 90 parts of a monomer mixture of styrene and acrylonitrile in a weight proportion of 70:30, in which a peroxide catalyst and a molecular weight regulating agent had been dissolved. Bulk polymerization was effected till a polymerization rate of 20–50% was attained whereby to obtain a viscous dope. The product was placed in a suspension polymerization tank charged with 100 parts of water containing an Mg-salt as a dispersion stabilizer. Polymerization was effected under predetermined conventional conditions of temperature and time. After completion of the polymerization, an acrylonitrile/styrene/butadiene terpolymer comprising particles of diameters in the range of 100 to 1000μ and having a residual monomer content of 1 to 5 wt.% was obtained in the form of a slurry.

Before carrying out the steam distillation, the slurry was controlled by addition of 0.05 part of Nissan Disfoam (trade mark) to 100 parts of the slurry to obtain the liquid to be treated.

Steam distillation was effected in the same manner as in Example 1 to obtain K=−0.41.

The embodiment of the invention in which an exclusive property or privilege is claimed are defined as follows:

1. A process for removing volatile matter from styrene resin, which consists essentially of the steps of continuously blowing a stream of steam at a velocity of above 100 m/sec directly into a charge of a suspension of styrene resin particles in hot water and contained in a pressure vessel, said steam being blown into said charge through nozzle means submerged in said charge, said styrene resin containing volatile matter therein, the temperature and pressure of said steam being effective to maintain the contents of said pressure vessel under a temperature of from 120° to 150° C. and a pressure of from 1.4 to 4.0 Kg/cm$^2$ gage, and simultaneously continuously mechanically agitating said suspension during the blowing of said steam thereinto so that a vapor phase of steam and said volatile matter can freely escape from the liquid phase; and continuously removing from the vessel a vapor stream consisting essentially of steam and volatile matter separated from said styrene resin.

2. A process according to claim 1 in which said charge contains an effective amount of an antifoaming agent for limiting foaming of said suspension and an effective amount of particles of an inorganic dispersant for maintaining said styrene resin particles dispersed in said hot water.

3. A process according to claim 1 in which the velocity of the stream of steam blown into the charge is about 200 m/sec.

4. A process according to claim 1, including the step of condensing said vapor stream and separating the condensate into an aqueous fraction and a fraction of volatile matter without refluxing the condensate into said vessel.

5. A process according to claim 1 in which said charge is the reaction product of the suspension polymerization of said styrene resin and said volatile matter is predominantly unreacted monomer.

* * * * *